United States Patent [19]
Porcari et al.

[11] Patent Number: 5,337,618
[45] Date of Patent: Aug. 16, 1994

[54] LOAD SENSING ASSEMBLY

[75] Inventors: Vincenzo Porcari; Gianluigi Riva, both of Milan, Italy

[73] Assignee: Ramsey Technology, Inc., Minneapolis, Minn.

[21] Appl. No.: 684,615

[22] Filed: Apr. 12, 1991

[30]  Foreign Application Priority Data

Apr. 20, 1990 [IT]  Italy ................... 20090-A/90

[51] Int. Cl.⁵ ................................ G01L 1/04
[52] U.S. Cl. ................. 73/862.634; 73/862.635; 73/862.638; 73/862.639
[58] Field of Search ........... 73/862.62, 862.63, 862.64, 73/862.65, 862.67, 862.47, 862.48, 862.49, 862.621, 862.622, 862.625, 862.624, 862.626, 862.627, 862.678, 862.629, 862.632, 862.633, 862.634, 862.637, 862.638, 862.639, 862.641; 177/255, 160

[56]  References Cited

U.S. PATENT DOCUMENTS

| | | | |
|---|---|---|---|
| 3,366,190 | 1/1968 | Lau | 177/255 |
| 3,788,411 | 1/1974 | Oxley | 73/862.64 |
| 4,597,297 | 7/1986 | Smith | 73/862.48 |
| 4,655,306 | 4/1987 | Saner | 73/862.65 |

*Primary Examiner*—Donald Woodiel
*Attorney, Agent, or Firm*—Carl A. Rowold

[57]  ABSTRACT

A load sensing assembly adapted to measure the weight of loads which act with both vertical and horizontal direction force components by resolving such force components solely into a vertical downward force component representative of the weight of the load is disclosed. This assembly comprises a first support member having a generally inclined leg portion fixedly mounted against movement, a second support member moveably mounted with respect to the first support member having a load support portion for supporting the load to be measured, a third member for interconnecting the first and second support members toward first ends thereof formed of elastically deformable material capable of transmitting only tensile force and no other types of force and a fourth member interconnecting the first and second support members toward the opposite ends thereof also formed of elastically deformable material capable of transmitting only tensile force and no other types of force. Together these four members form a quadrilateral load support structure for supporting a load to be measured which flexes under the load for transmitting only vertically downward forces applied by the load and no other forces. A load cell measures the load via the quadrilateral structure and produces a signal representative of the magnitude of the vertical downward force of the load.

9 Claims, 3 Drawing Sheets

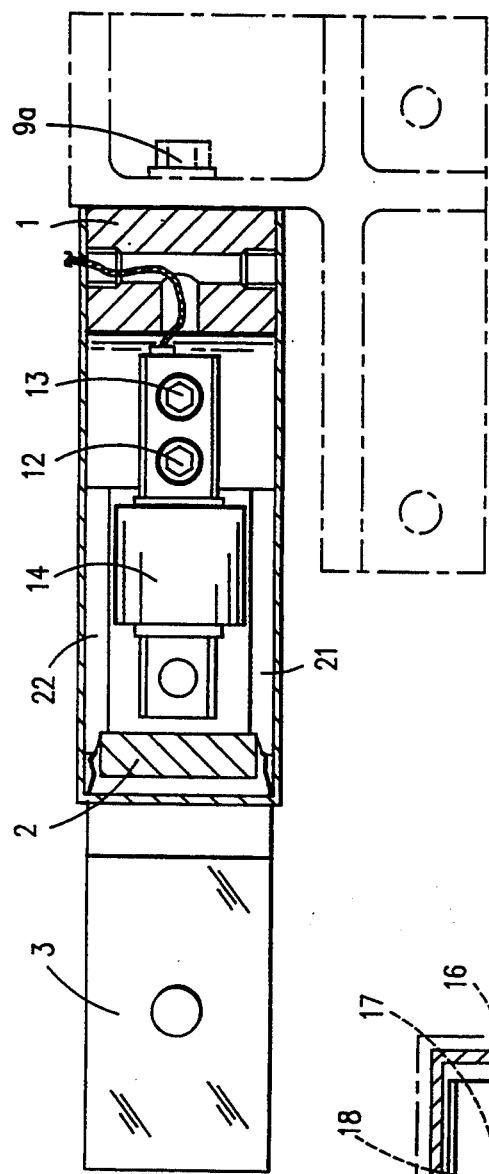
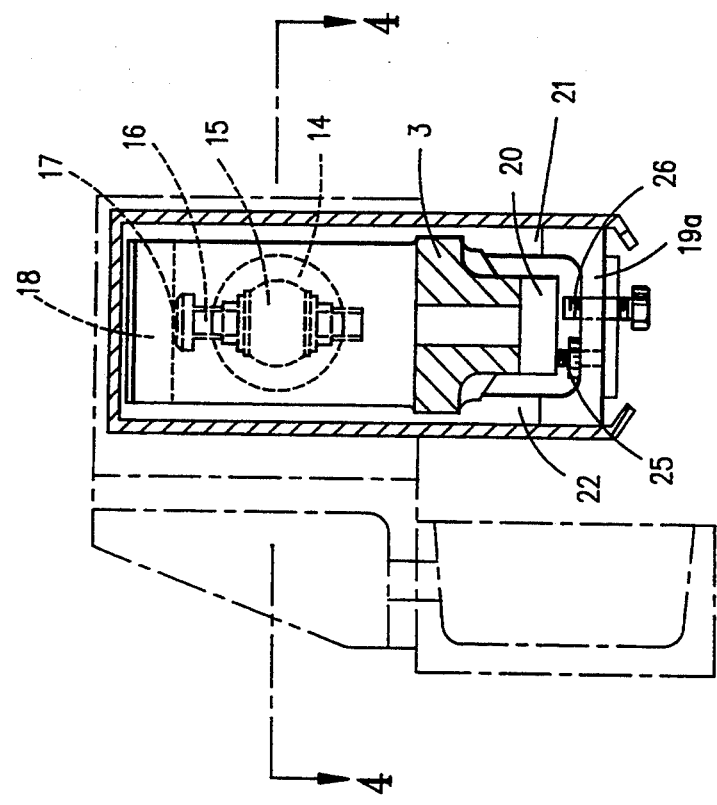

LOAD SENSING ASSEMBLY

BACKGROUND OF THE INVENTION

This invention relates to load sensing instrumentation and more particularly to load sensing assemblies for measuring the weight of loads which act with both vertical and horizontal directional force components. Reference is made to U.S. Pat. No. 4,682,664 showing prior art load sensing systems for conveyor weigh scales. As described in this patent, accurate measurement of the weight of loads which act with both horizontal and vertical force components, such as conveyor belts while carrying a load of material to be transported, has long been a problem. Various systems have been proposed for attempting to resolve these loads solely into their vertical downward force component. In U.S. Pat. No. 4,682,664 a conveyor weighbridge system having cantilever load cell bridge units is disclosed. While this unit offers some improvement in vertical resolution of the load, it (like the systems described in that patent as being prior art) is of relatively complex construction, require mechanical calibration mechanisms and are still subject to lateral forces which can affect the weight measurement of the load cell unit.

SUMMARY OF THE INVENTION

Among the several objects of the invention may be noted the provision of an improved load sensing assembly having increased load resolution; the provision of such assembly in which the load support structure is capable of transmitting only normal (typically downward) forces from the load to be measured and not longitudinal or transverse lateral (typically horizontal) forces applied by the load; the provision of such assembly in which the need for associated mechanical calibration devices is eliminated; the provision of such system which eliminates the need for complex mechanical linkages and interconnections so as to be operable; and the provision of such system which is relatively easy to install and operate.

In general, the assembly of this invention is adapted to measure the normal directional force component of loads which act with both generally normal and generally longitudinal and horizontal lateral directional force components with respect to the load sensing assembly by resolving such force components solely into a normal force component (e.g., the weight) of the load. The assembly comprises a first support member having a generally inclined leg portion extending in a first direction, with said first support fixedly mounted against movement and thereby constituting a fixed support member. The assembly further comprises a second support member moveably mounted with respect to the first support member and constituting a moveable support member having a generally inclined leg portion extending from a position above the lower end of the fixed support member downward past the fixed support member in a second direction generally opposite to the stated first direction. A load support portion is provided on the leg portion of this moveable support member for supporting the load to be measured. A third member interconnects the fixed and moveable support members toward first ends thereof, with said third interconnecting member being formed of elastically deformable material capable of transmitting and carrying only tensile force and no other types of force. A fourth member interconnects the fixed and moveable support members toward second ends thereof opposite to the first ends. This fourth interconnecting member is also formed of elastically deformable material capable of transmitting and carrying only tensile force and no other types of forces. The fixed and moveable support members and the third and fourth interconnecting members together define a quadrilateral load cell support structure for supporting the load to be measured. This support structure flexes under the load thereby transmitting only normal force components applied by the load to the load cell structure and no other forces. Load cell means are associated with the moveable support member and is moveable therewith under the normal force component applied by the load so as to produce a signal representative of the magnitude of said normal force component.

Other objects and features will be in part apparent and in part pointed out herein and after.

BRIEF DESCRIPTION OF THE DRAWINGS

FIG. 3 is a vertical section on line III—III of FIG. 2; and

FIG. 4 is a horizontal section of the load sensing assembly on line IV—IV of FIG. 3.

Corresponding reference characters indicate corresponding parts throughout the several views of the drawings.

DESCRIPTION OF THE PREFERRED EMBODIMENT

Figure 1:
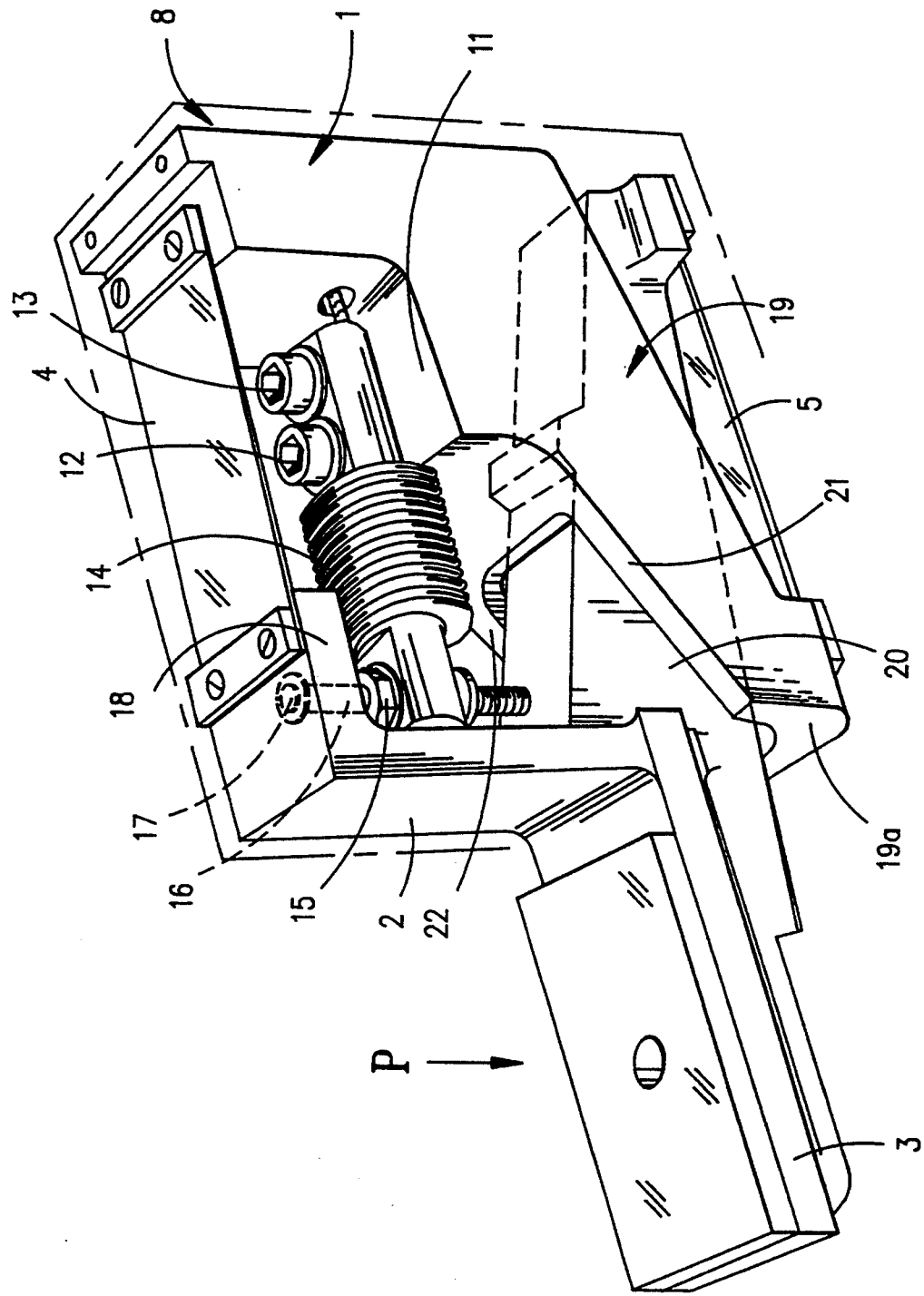
FIG. 1 is a perspective view of the load sensing assembly of this invention in position for supporting and measuring the generally downwardly acting (i.e., the normal) force component of a load.

Referring to the drawings, and more particularly to FIG. 1, there is generally indicated at 1 the load sensing assembly of this invention in position for supporting and measuring a load which in shown as acting with in a vertical downward direction as its primary directional force component as shown by the arrow P. However, it is to be understood that the load sensing assembly may be mounted in any other orientation, including vertically, such that it carries and measures a load acting with its primary force component (i.e., the force component to be measured) acting generally normal to the load support portion of the load sensing assembly. Reference hereinafter to the vertical and horizontal directions in connection with the load sensing assembly 1 and the directional force components of the load P is done to facilitate the description of the structure and operation of the load sensing assembly 1 as depicted in the Figs. However, such description is not intended to limit the orientation, structure, operation or application of the load sensing assembly of this invention, with the term vertical as herein used thus being intended to encompass the term normal and the term horizontal as herein used thus being intended to encompass the terms longitudinal, transverse and lateral for orientations of the load sensing assembly other than that depicted in the Figs.

The load P may be of the type such as presented by a conveyor belt weighbridge which acts with both vertical and horizontal directional force components (i.e., normal, and longitudinal and transverse force components). The load sensing assembly of this invention operates to resolve such force components solely into a vertical downward force component (i.e., the normal force) which is representative of the desired or normal directional force component of the load (e.g., the weight of the load P as shown in the FIGS.) load P.

The load sensing assembly comprises first and second support members, 1 and 2 respectively. The first support member comprises a generally inclined leg portion 19 extending in a first horizontal direction and a generally vertical arm portion. This first support member is affixedly mounted on suitable means, such as stationary exterior support wall 8, against movement and thereby constitutes a fixed support member. The inclined leg portion 19 is formed with an aperture or slot in its lower end that receives the second support member 2. This slot is defined by side members 21 and 22 and lower cross member 19A. The fixed support member 1 further has a horizontal extending shoulder 11 for carrying a load cell means 14 as described in detail hereinafter.

Figure 2:
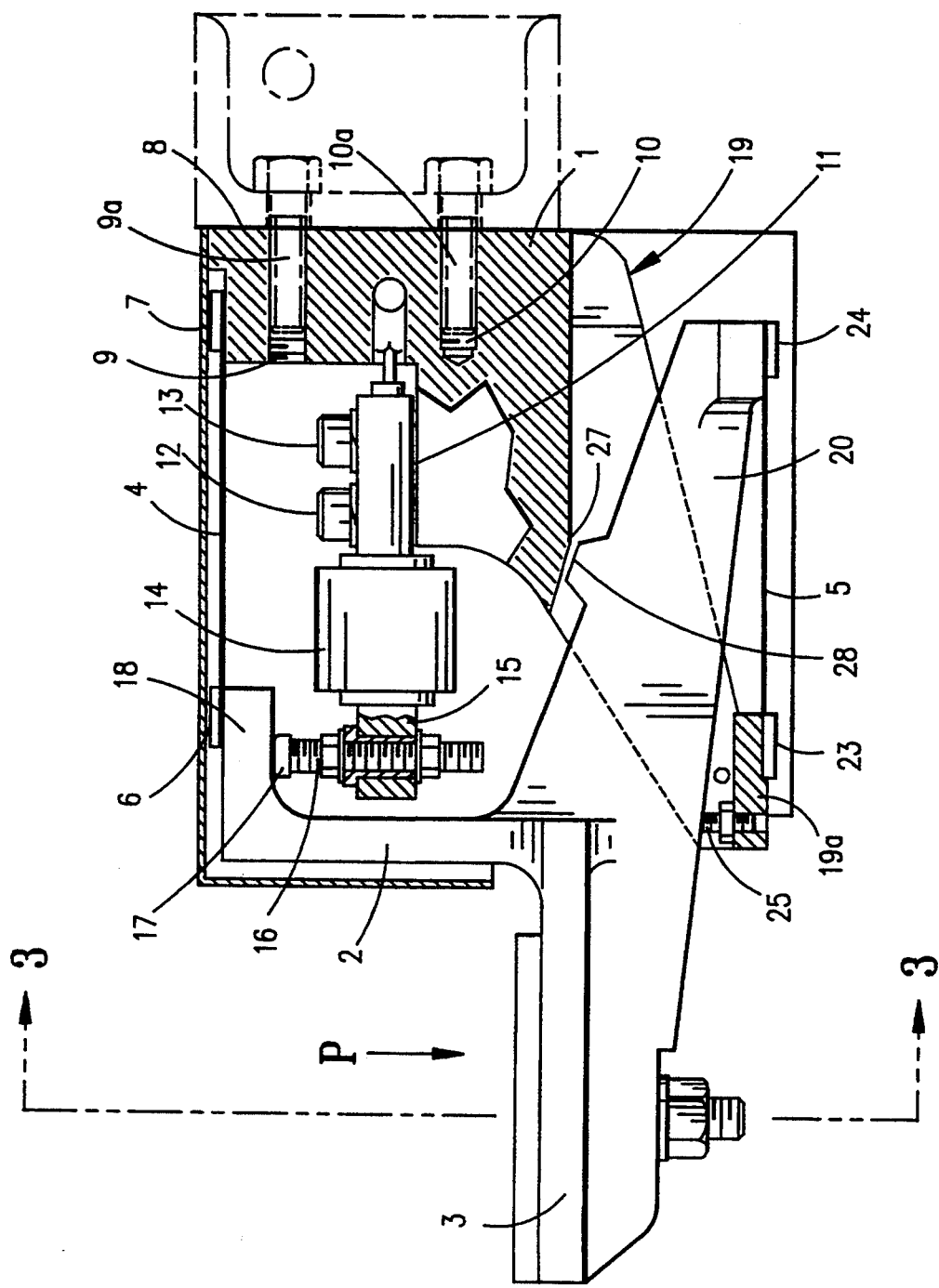
FIG. 2 is a side elevation and partial vertical section of the load sensing assembly.

The second support member 2 comprises an inclined leg portion 20, a generally vertical arm portion extending up from the inclined leg portion, a horizontal or lug extending from the vertical arm forming a load transfer portion 18 and a horizontal bracket extending from the arm forming a load support portion 3. The inclined leg portion 20 extends from a point above the lower end of the leg 19 of the fixed support member downwardly and horizontally through the slot in the inclined leg portion 19 to an end generally at the same level as the cross member 19A but spaced horizontally from it. As best seen in FIGS. 1 and 2 the inclined leg portion 20 thus extends in a second horizontal direction generally opposite to the first horizontal direction defined by the inclined leg portion 19. The load transfer portion 18 of this moveable support member extends in generally the same horizontal direction as the inclined leg portion 20. The load support portion 3 extends generally horizontally in the same direction as the inclined leg portion 19 of the fixed support member.

Third and fourth members, 4 and 5 respectively, interconnect the fixed and moveable support members for enabling the moveable support member to move relative to the fixed support member in response to the vertical force component of the load P. Both the third and fourth members are formed of a strip of suitable elastically deformable material, such as (steel? or elastomeric material?), capable of transmitting and carrying only tensile force and no other types of forces. The first interconnecting member is secured to the respective first ends (e.g., the upper ends as shown in FIGS. 1 and 2) of the fixed and moveable support members by means of conventional detachable fasteners 6 and 7. The second interconnecting means 5 is secured at the opposite ends of the fixed and moveable support members (e.g., the lower ends of these members as shown in FIGS. 1 and 2) by conventional detachable fasteners 23 and 24.

As best shown in FIG. 2, load cell means 14 is mounted on the shoulder 11 of the fixed support member by means of threaded fasteners 12 and 13 which extend down through holes in an end extension of the load cell and are received in threaded bores not shown in the fixed support member. A cantilevered end portion 15 extends from the load cell at its opposite end and carries a probe or tracer 16 having an upper head or end engageable with the underside of the load transfer portion 18 of the moveable support member 2. Mounting the fixed support member to the stationary exterior wall support 8 adjacent to the load cell are conventional mounting means such as upper and lower bolts 9A and 10A respectively received in upper and lower threaded bores 9 and 10 in the fixed support member. As best shown in FIG. 4, an electrical cable extends from the load cell 14 through passages formed in the fixed support member.

The fixed and moveable support members together with the third and fourth interconnecting members together define a quadrilateral load cell support structure for supporting the load P to be measured. This structure flexes downwardly under the load, thus transmitting only vertically downward forces via the load transfer portion 18 of the moveable support member to the tracer 16 of the load cell means 14. Because the interconnecting means are formed of members capable of carrying only tensile force and no other types of forces, this quadrilateral structure is similarly capable of transmitting only vertical forces and no other types of forces. Thus the load cell 14 measures only the vertical downward force component applied by the load and produces a signal representative only of the magnitude of said vertical downward force component and no other forces. These signals are generated in the form of electrical pulses transmitted away from the load sensing assembly via the electrical cable extending the through the passage in the fixed support member as shown in FIG. 4. This cable is connected to conventionally known load cell electrical circuitry (not shown) where the signals generated by the load cell are received and measured to produce an output representative of the magnitude of the weight of the load, or to control process equipment.

Referring now to FIG. 3 of the drawings there is shown means for limiting the relative movement of the moveable support member relative to the fixed support member. As is evident from FIGS. 1 and 2 when a load P is received on the load support portion 3 of the moveable support member this member tends to move downwardly relative to the fixed support member 1. As it does the first and second interconnecting members 4 and 5 are placed in tension and elastically deform under the applied load. The extent of the deformation of these members is a function of the magnitude of the load applied and thus the quadrilateral structure flexes under the load to a degree reflecting the amount of the load P. To limit the range of downward movement of the inclined arm 20 of the moveable support member an adjustable stop means 25 is provided in the cross member 19A of the fixed support member. This adjustable stop member consist of a threaded pin and nut in a bore in the cross member 19A.

Similarly to prevent undesired movement of the moveable support member relative to the fixed support member during transport and installation of the load sensing assembly, means are provided for holding the moveable support member in abutment with the fixed support member. These means comprise a abutment screw 26 threaded in a bore in the cross member 19A which bears against the lower end of the inclined arm 20 of the moveable support member. The inclined arm 20 of the moveable support is provided with an abutment member 28 which is engageable with an abutment surface 27 provided on the upper end of the slot in the fixed support member. When the abutment screw is brought up into engagement with the lower surface of the inclined arm 20 continued movement of the abutment screw will place the abutment member 28 of the moveable support member in forced engagement with the abutment surface 27 of the fixed support member 1, thereby locking the moveable support member against movement relative to the fixed support member 1.

While in the embodiment of the load sensing assembly as depicted in FIGS. 1-4, the fixed support member 5 is secured to a stationary exterior support wall (such as wall 8) at its upper end, the load P is applied via the load support portion 3 to the upper end of the inclined leg portion 20 of the moveable support member, and the interconnecting members 4, 5 connect upper and lower ends of the support members, alternative embodiments of the load sensing assembly are envisioned within the scope of this invention. In these embodiments, the fixed support member may be supported at its lower end, the load P may be applied to the lower end of the moveable support member and the interconnecting members may connect an upper end of the fixed support member with the lower end of the inclined leg portion of the moveable support member and vise versa. For these alternative embodiments to be operable it is required that the inclined leg portions of the fixed and moveable support members extend in generally opposite directions from positions above the lower ends of the opposite members downwardly past each other, and that the interconnecting members of elastically deformable material interconnecting ends of the inclined leg portions be so positioned relative to the support members that both of the interconnection members are placed in tension and thus transmit the load P applied to the moveable support member.

In view of the above, it will be seen that the several objects of the invention are achieved and other advantageous results obtained.

As various changes could be made in the above construction without departing from the scope of the invention, it is intended that all matter contained in the above description are shown in the accompanying drawings shall be interpreted as illustrative and not in a limiting sense.

What is claimed is:

1. A load sensing assembly adapted to measure the normal force component of loads which act with normal, as well as longitudinal and transverse directional force components relative to the load sensing assembly by resolving such force components solely into a normal force component representative of the load, said load sensing assembly comprising:
    A) a first support member having a generally inclined leg portion extending in a first direction, with said first support member fixedly mounted against movement and thereby constituting a fixed support member;
    B) a second support member moveably mounted with respect to the first support member and constituting a moveable support member having a generally inclined leg portion extending from a position above the lower end of the fixed support member downward past the fixed support member in a second direction generally opposite to said first direction, and a load support portion on said leg portion for supporting the load to be measured;
    C) a third member for interconnecting the fixed and moveable support members toward first ends thereof, said third member being formed of a suitable elastically deformable material and being positioned relative to the fixed and moveable support members for transmitting and carrying only tensile force and no other types of force;
    D) a fourth member interconnects the fixed and moveable support members toward second ends thereof opposite to the first ends, said fourth member being formed of elastically deformable material and being positioned relative to the fixed and moveable support members for transmitting and carrying only tensile force and no other types of forces;
    E) the fixed and moveable support members, and the third and fourth members together defining a quadrilateral load cell support structure for supporting the load to be measured, and flexing under the load thereby transmitting only normal force component applied by the load to the load cell structure and no other forces; and
    F) a load cell associated with the moveable support member and moveable therewith under the normal force component applied by the load to produce a signal representative of the magnitude of said normal force component.

2. A load sensing assembly as set forth in claim 1 wherein the fixed support member further includes an arm portion affixedly mounted against movement.

3. A load sensing assembly as set forth in claim 2 wherein the moveable support member further includes an arm portion moveable with respect to the fixed support member.

4. A load sensing assembly as set forth in claim 3 wherein one of the third or fourth members is secured to and extends between the arm portions of the fixed and moveable support members.

5. A load sensing assembly as set forth in claim 1 wherein the third or fourth members is attached to and extends between upper ends of the fixed and moveable support members.

6. The load sensing assembly of claim 1 wherein said load support portion comprises a projection extending from the moveable support member generally in said first direction, said projection being engageable by the load to be measured.

7. The load sensing assembly of claim 1 wherein said moveable support member further includes a load transfer portion extending from the moveable support member generally in said second horizontal direction.

8. The load sensing assembly of claim 7 wherein the load transfer portion is engageable by the load cell.

9. The load sensing assembly of claim 1 further comprising interengageable abutment means on the fixed and moveable support members for limiting the range of movement of the arm portion of the moveable support member toward the respective arm portion of the fixed support member.

* * * * *